Patented Dec. 7, 1943

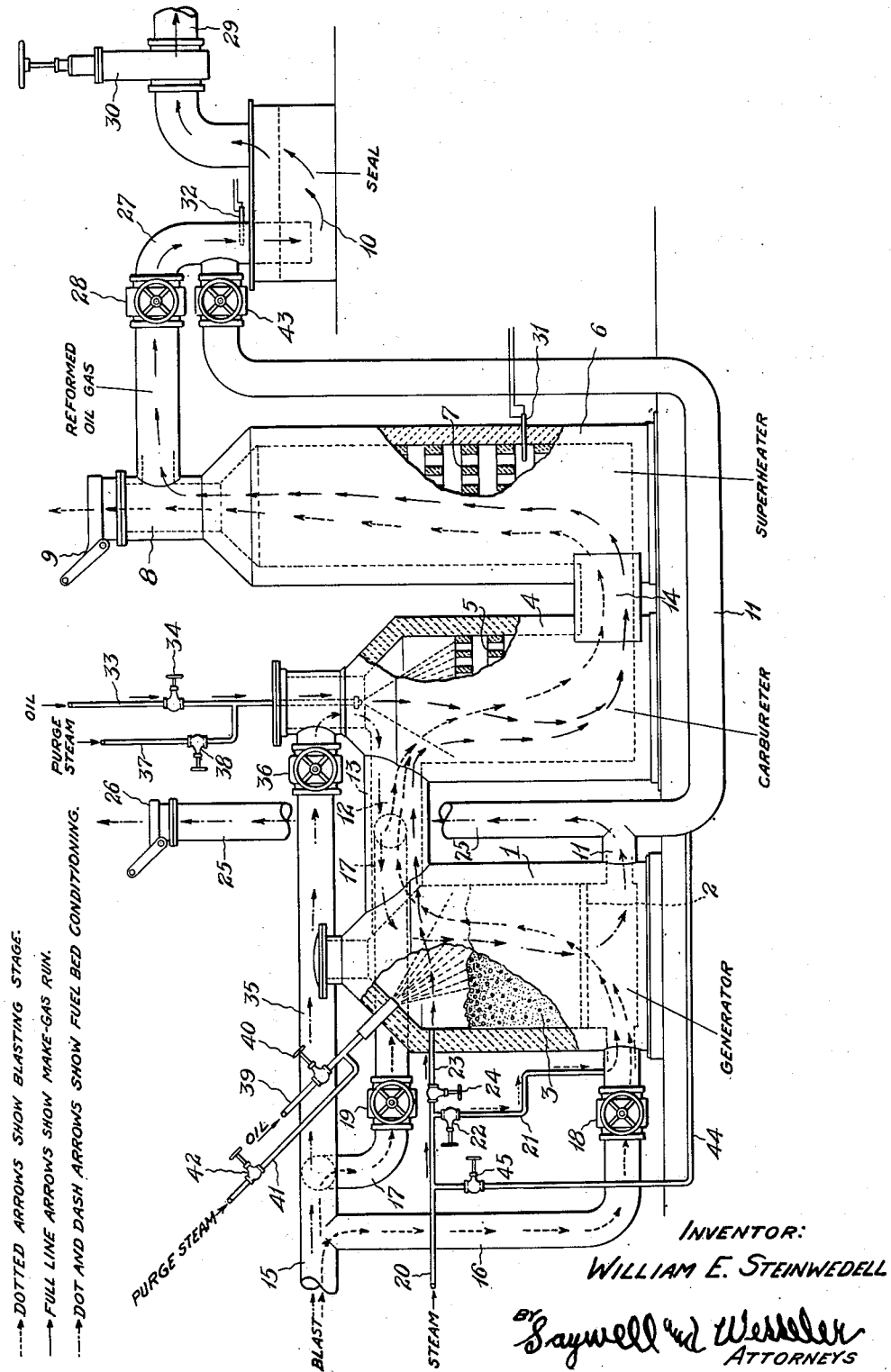

2,336,311

UNITED STATES PATENT OFFICE 2,336,311

PROCESS OF MAKING A SUBSTITUTE GAS FOR NATURAL GAS IN STANDARD CARBURETED WATER GAS APPARATUS

William E. Steinwedell, Cleveland Heights, Ohio, assignor to The Gas Machinery Company, Cleveland, Ohio, a corporation of Ohio Application October 24, 1941, Serial No. 416,358

8 Claims. (Cl. 48—214)

The invention particularly relates to a process of producing a gas which will be satisfactory as a substitute for natural gas, by the use of standard apparatus for producing carbureted water gas, which substitute gas will have burning characteristics quite analogous to those of natural gas, so that the pilot lights, burner equipment, and cooking utensils will not become sooted. Gases which produce these sooty conditions contain a too high percentage of illuminants, due to the production of the gases at the temperatures usually employed in manufacturing carbureted water gas. The sooty condition results in the gas losing considerable heating value on cooling or by compression.

One very important advantage of the instant improved process is that it increases the efficiency of standard carbureted water gas apparatus to a marked degree.

Furthermore, the substitute gas produced by the instant improved process has a specific gravity which is not so high as to cause a noisy flashback in the burners, which condition obtains with gases which produce soot. These sooty gases mentioned furthermore do not have characteristics approximating those of natural gas. The disadvantages which have been mentioned, as also lack of economy, have been present in a gas which has heretofore been made in carbureted water gas sets by enriching a small amount of blue gas produced in the generator with a large amount of oil gas made in the carbureter and superheater. In thus heretofore attempting to produce a satisfactory gas, it was attempted to produce a thermal value sufficiently high, a proper specific gravity, and a suitable chemical analysis, but the disadvantages mentioned are present in the product thus produced.

The instant improved process which results in the elimination of the disadvantages above mentioned depends upon operating the carbureted water gas set upon a temperature cycle instead of a time cycle. Specifically, the cycle is controlled by the temperature of the checkerbrick in the carbureter and superheater. As hereinafter described in detail, the checkerbrick in the carbureter and superheater are raised during the air-blasting period to a higher point than that to which they are usually raised in standard carbureted water gas making practice, and the oil gas made is subjected to this higher temperature, preferably in a steam atmosphere, which effects a reforming of the oil gas with consequent advantages hereinafter fully described.

Furthermore, the instant improved process depends upon supplying oil to the top of the generator, in addition to the amount thereof normally supplied to the carbureter, in carbureted water gas manufacture, so that this additional oil reaches the carbureter as hot oil gas and therefore does not adversely cool down the checkerbrick in the carbureter and superheater as it would if it were supplied as additional cold oil to the carbureter direct.

The annexed drawing and the following description set forth in detail certain steps illustrating my improved process, these steps constituting but a few of the various series of steps by which the improved process may be carried out.

The annexed drawing consists of a single figure illustrating one standard form of apparatus for the production of carbureted water gas, this particular form of apparatus being one of those forms thereof utilized for the manufacture of carbureted water gas by the back-run process.

Referring to said annexed drawing, the standard form of apparatus shown therein for making carbureted water gas by the back-run process has a generator 1 provided with a grate 2 upon which is built the fuel bed 3, the apparatus further comprising a carbureter 4 with its checkerbrick 5, a superheater 6 with its checkerbrick 7, and a stack T 8 upon the superheater 6 which is controlled by a stack valve 9. The gas products for storage and use are conducted during an up-run carbureted water gas make-period from the superheater 6 through a pipe 27 controlled by a valve 28 to a seal 10 and thence to a holder (not shown) through a pipe 29 controlled by a valve 30. The gas products for storage and use are conducted from the bottom of the generator 1 during a carbureted water gas back-run make-period through a pipe 11 directly to the seal 10, this pipe 11 being controlled adjacent the seal by a valve 43, but in the instant process the valve 43 remains closed and the back-run pipe 11 is only used for down blasting as hereinafter described. Upstanding from the back-run make gas pipe 11 is an auxiliary stack 25 controlled by a stack valve 26. A connection 12 having a lining 13 communicates with the top of the generator 1 and the top of the carbureter 4. There is also a connection 14 between the bottom of the carbureter 4 and the bottom of the superheater 6.

For the purposes of the usual air-blasting, a main air line 15 is formed with branches 16 and 17 which communicate respectively with the bottom of the generator 1 and the connection 12 between the generator 1 and the carbureter 4, these branch blast lines 16 and 17 being provided with valves 18 and 19, respectively. Also, the main air line 15 through a portion 35 thereof controlled by a valve 36 communicates with the top of the carbureter 4.

The standard carbureted water gas set shown is designed for both steam up-runs and steam down-runs through the generator 1, and to that end a main steam line 20 is formed with branches 21 and 23 which communicate respectively with the bottom and top of the generator 1 and are provided with valves 22 and 24, respectively. In the working of the instant improved process it is preferable during the "make" period to have a smaller amount than the blast quantity of steam enter the bottom of the generator 1 to act as a steam curtain and prevent blue or oil gases from passing downwardly through the fuel bed 3, and to effect such result a branch steam line 44 which communicates with the back-run pipe 11 is provided, which branch steam line 44 is controlled by a valve 45. The amount of steam utilized to form this steam curtain is comparatively small, and the function of the curtain is to prevent the formation of an explosive mixture which might function during the subsequent blasting stage.

When, in carbureted water gas manufacture, the "make" of blue gas is upwardly through the generator 1, the valve 28 controlling the connection 27 is open, and the valve 43 controlling the back-run made gas pipe 11 is closed. When the "make" of blue gas is downwardly through the generator 1, the valve 43 controlling the back-run made gas pipe 11 is open and the valve 28 controlling the pipe 27 is closed. Inasmuch as the blasting and gas-making of the instant process are always upwardly through the generator 1, the pipe 11 forming the bottom offtake from the generator 1 for conducting the down-run made gas directly to the seal 10 by the back-run, in the ordinary use of the described apparatus, is not utilized in the working of the instant improved process except as a portion of it is utilized to conduct blast gases to the auxiliary stack 25, during certain conditionings of the fuel bed and to conduct a relatively small amount of steam to the generator 1 during the "make" gas period, as hereinafter fully described. Therefore, in the instant improved process, the valve 43 is always closed. Communicating with the top of the carbureter 4 is a pipe 33 controlled by a valve 34 and utilized for spraying into the top of the carbureter 4 the medium to be reformed, such as oil or propane or butane or any other similar medium of character suitable for reforming. Communicating with this pipe 33 below the valve 34 is a pipe 37 controlled by a valve 38 and utilized in the instant process as a steam purge pipe, as hereinafter fully described. Communicating with the top of the generator 1 is a pipe 39 controlled by a valve 40 utilized to spray an additional amount of the medium to be reformed into the top of the generator 1, a second pipe 41 controlled by a valve 42 and also serving as a steam purge pipe communicating with the pipe 39 below the valve 40.

In practicing the instant process, and assuming the fuel bed 3 has been conditioned or is conditioned by reason of previous cycles of operation, the stack valve 9 is first opened, all other valves except valves 28 and 30 being closed, and then, preferably, the steam line valve 22 is opened. Concurrently with or immediately after the opening of the steam line valve 22, the generator air blast valve 18 and the carbureter air blast valve 19 are opened. In addition to the producer gas made in the generator by the blow, a small amount of blue gas is generated in the generator 1 by the steam from the line 21, which gases pass through the lined connection 12 where they are burned by the carbureter blast coming through the branch air line 17 and thence pass downwardly through the checkerbrick 5 in the carbureter 4, through the connection 14 and upwardly through the checkerbrick 7 in the superheater 6 and thence out the stack 8. The fact that the steam valve 22 is open during this blow period creates a steam atmosphere in the bottom of the generator 1, thus providing steam to keep the fuel bed 3 in proper condition during the blasting period. This steam atmosphere increases the heating value of the blow gases, and the small amount of blue gas generated concurrently with the air blasting somewhat shortens the blow period. Steam can be admitted to the generator 1 by valve 22, 24 or 45 at all times except when down blasting the generator 1, when charging the generator, or when shutting down the set. The various steam admittances are herein fully explained.

The air-blasting of the fuel bed 3 in the generator 1, and the air-blasting of the carbureter 4, and the simultaneous production of a small amount of blue gas by reason of the reaction of the steam in the fuel bed 3, is continued for such a period as will raise the temperature of the checkerbrick 5 and 7 to a point exceeding that to which they are brought during the air-blasting period in normal carbureted water gas manufacture. For instance, the temperature of the checkerbrick may be raised to about 1850° F. before starting the "make" period; whereas, in normal carbureted water gas manufacture this temperature would be raised to about 1450° F. before starting the "make" period, the temperature during carbureted water gas manufacture and the temperature during the manufacture of the substitute gas herein described both depending on the characteristics of the oil used. But for the same oil characteristics the temperature of the checkerbrick during the manufacture of the herein described substitute gas will be raised higher than for the manufacture of carbureted water gas.

Then the air blast valve 19, the air blast valve 18, and the steam valve 22, are closed. The apparatus is then ready for a "make" or "run", which is effected by opening the steam line valve 45 to admit a comparatively small amount of steam to produce a steam curtain in the bottom of the generator, opening the steam line valve 24 permitting "process" steam to pass via the pipe 23 into the top of the generator 1 where it is heated and whence it passes outwardly into the connection 12 where its temperature is further raised by the heat of the lining 13, after which it passes into the top of the carbureter, and thence downwardly through the checkerbrick 5 therein, together with oil which is sprayed into the top of the carbureter 4 from the pipe 33, the oil-line valve 34 having been opened immediately after opening the steam line valve 24. Also, concurrently with the opening of the oil-line valve 34, the valve 40 controlling the oil pipe 39 is opened, which effects the spraying of oil into the top of the generator 1. This oil from the oil pipe 39 passes from the generator 1 as hot oil gas through the connection 12 in which connection it is further heated and thence passes into the carbureter 4. This oil sprayed into the generator 1 during the run period is in addition to the amount of oil sprayed into the carbureter 4 from the pipe 33, which latter spray is as large as possible but not so large as to unduly cool the checkerbrick 5, so that, inasmuch as the additional oil sprayed into the generator 1 reaches the carbureter as hot oil gas, this additional amount of oil can be utilized during the make-gas period without unduly cooling the checkerbrick 5. The oil gas which enters the carbureter 4 from the connection 12 and the oil which is sprayed into the carbureter 4 from the pipe 33 passes downwardly through the checkerbrick 5 in the carbureter 4, together with the heated steam, and thence passes through the connection 14 and upwardly through the checkerbrick 7 in the superheater 6 and through the stack 8 and outwardly to atmosphere. This effects the reforming of the oil gas in a steam atmosphere in the carbureter 4 and the superheater 6 and, as soon as such reformed oil gas commences to issue from the stack 8, the set is making the desired gas suitable for storage and use, so that then the stack valve 9 is closed, and the reformed gas passes through the connection 27, valve 28 having been opened and valve 43 closed before starting operations, and issues from the dip end thereof into the seal 10 whence it passes through the connection 29 to the holder. Valve 30 was also opened before starting operations and is only closed during the down blasting period hereinafter described.

The steam curtain provided during the "make" period allows a smaller amount of steam than the blast quantity of steam to enter the bottom of the generator 1 through steam line 44 and the back-run pipe 11, which steam does not injure the quality of the gas made since the quantity of blue gas generated therefrom is very small. This steam curtain during the "make" period prevents blue gas or oil gas obtaining access to the bottom of the generator 1 and creating an explosive mixture.

The gas-making period is continued until the temperature of the checkerbrick 5 and 7 has fallen to a point below which gas of the desired characteristics, which will be hereinafter explained, is no longer made. This point approximates that to which the checkerbrick is heated during normal carbureted water gas manufacture. The temperature is gauged by pyrometers 31 and 32 which serve, respectively, to measure the temperature of the checkerbrick 7 in the superheater 6, and the temperature of the gas passing through the connection 27 from the superheater 6 to the seal 10. As is well-known to those skilled in the art, the temperature of the checkerbrick 5 in the carbureter 4 tends to fall during the oil-gas-making period faster than does that of the checkerbrick 7 in the superheater 6, but it is necessary only to watch the temperature-fall in the checkerbrick 7 as this is indicative of the heat to which the oil gas is subjected.

When the oil-gas-making period has ended, as determined by the temperature of the checkerbrick 7, or the temperature of the gas produced, the oil-control valves 34 and 40 are closed, and the steam purge valves 38 and 42 opened thereby to free the oil sprays of oil and more quickly purge the carbureter and superheater of oil gas. When the oil gas has substantially all passed beyond the dip end of the connection 27 into the seal 10, the stack valve 9 is opened, the steam valves 24, 38, 42 and 45 are closed, the steam valve 22 is opened and the air blast valves 18 and 19 opened, and the set is then ready for reheating and the next cycle of operations.

Different conditions may dictate some variations in the cycle of operations above-described. In cases where the substitute gas is made for relatively long periods of time, it is advisable occasionally to air blast down through the fuel bed by means of the air blast line 35 controlled by the blast valve 36. This operation is for the purpose of maintaining sufficient heat in the top of the generator 1, and a better condition of the fuel bed, and to keep the fire closer to the grates. For this operation the stack valve 26 at the top of the auxiliary stack 25 and the valve 36 in the air line portion 35 are opened, the valve 30 in the outlet line 29 from the seal 10 and all other valves being closed.

In those situations where a change has been made from manufactured gas of about 550 B. t. u. to natural gas of about 1000 B. t. u., in order to place a high load factor upon the supply main and obtain a lower cost natural gas, it is necessary that the former carbureted water gas plants be supplied with smaller capacity and additional steam meters, larger capacity oil spray for the carbureter, an additional oil spray for the generator, a down blast valve and piping, and a down blast stack, stack valve and piping, so that gas can be manufactured by this process to take care of the peak loads.

The subjecting of the oil gas in a steam atmosphere to the higher temperatures in the carbureter and superheater reforms the high thermal value oil gas with its undesirably high percentage of illuminants down to the desired thermal value and chemical composition, part of the illuminants in the gas being transformed into marsh gas and hydrogen and producing a product which is well fixed and stable. The quality of this resultant product depends upon the temperature to which it is subjected and its time contact with the hot checkerbrick, a higher temperature and longer time of contact producing a gas of lower heating value containing less illuminants, and vice versa. Under the conditions stated, sets which are suitable for making carbureted water gas of about 550 B. t. u. value can be utilized to make a reformed oil gas which will serve as a satisfactory substitute for natural gas of about 1000 B. t. u. value. The reformed gas is burned in the various appliances as adjusted for natural gas with entirely satisfactory operation of the appliances, no sooting of the latter resulting and no noisy flashing back occurring in the burners.

An analysis of a typical product produced by my improved process is as follows:

| | Per cent |
|---|---|
| Oxygen, approximately | .5 |
| Methane, approximately | 39.0 |
| Hydrogen, approximately | 25.0 |
| Carbon monoxide, approximately | 5.0 |
| Carbon dioxide, approximately | 1.5 |
| Nitrogen, approximately | 4.0 |
| Illuminants, approximately | 25.0 |

This typical product has a B. t. u. value of approximately 1000, and a specific gravity of about .65.

What I claim is:

1. A process of making a substitute gas for natural gas having substantially the same characteristics as natural gas with respect to B. t. u. heating value and burning characteristics, said process being worked in standard carbureted water gas apparatus having a generator, a carbureter, a superheater, a lined connection between the top of the generator and the top of the carbureter, a connection between the carbureter and the superheater, an outlet from the generator, and a made-gas outlet from the superheater, which process comprises upwardly air-blasting the fuel bed in the generator and at the same time air-blasting the carbureter to heat the top of the generator and the lining of the connection between the generator and carbureter and to heat the checkerbrick in the carbureter and superheater, said blasting being effected sufficiently to heat said checkerbrick materially above the temperature to which the same is heated in carbureted water gas manufacture utilizing oil having substantially the same characteristics as the oil hereinafter mentioned as being admitted to the tops of the generator and carbureter, respectively; then admitting steam to the top of the generator and passing the same through said connection to the carbureter and at the same time admitting oil to the tops of the generator and carbureter, respectively, thus producing reformed oil gas in a steam atmosphere, and then withdrawing the resultant products from the superheater for strorage and use, the oil gas production being stopped when the temperature of the checkerbrick has dropped only to a temperature substantially higher than the temperature to which it would be dropped during the carbureting stage in carbureted water gas manufacture utilizing oil for carbureting purposes having substantially the same characteristics.

2. A process, as set forth in claim 1, characterized additionally by the admission of steam to the bottom of the generator concurrently with the air-blasting.

3. A process of making a substitute gas for natural gas having substantially the same characteristics as natural gas with respect to B. t. u. heating value and burning characteristics, said process being worked in standard carbureted water gas apparatus having a generator, a carbureter, a superheater, a lined connection between the top of the generator and the top of the carbureter, a connection between the carbureter and the superheater, an outlet from the generator, and a made-gas outlet from the superheater, which process comprises upwardly air-blasting the fuel bed in the generator and at the same time air-blasting the carbureter to heat the top of the generator and the lining of the connection between the generator and carbureter and to heat the checkerbrick in the carbureter and superheater, said blasting being effected sufficiently to heat said checkerbrick materially above the temperature to which the same is heated in carbureted water gas manufacture utilizing oil having substantially the same characteristics as the oil hereinafter mentioned as being admitted to the tops of the generator and carbureter, respectively; then admitting steam to the top of the generator and passing the same through said connection to the carbureter and at the same time admitting oil to the tops of the generator and carbureter, respectively, thus producing reformed oil gas in a steam atmosphere, and then withdrawing the resultant products from the superheater for storage and use, the oil gas production being stopped when the temperature of the checkerbrick has dropped to a temperature approximating the temperature to which the same would be heated by air-blasting in carbureted water gas manufacture utilizing oil for carbureting purposes having substantially the same characteristics.

4. A process, as set forth in claim 1, characterized additionally by a steam purging step, after the step in which the reformed oil gas is produced, by means of steam admitted to the tops of the generator and carbureter and passed through the carbureter and superheater.

5. A process of making a substitute gas for natural gas having substantially the same characteristics as natural gas with respect to B. t. u. heating value and burning characteristics, said process being worked in standard carbureted water gas apparatus having a generator, a carbureter, a superheater, a lined connection between the top of the generator and the top of the carbureter, an outlet from the bottom of the generator, a connection between the carbureter and the superheater, and a made-gas outlet from the superheater, which process comprises upwardly air-blasting the fuel bed in the generator and at the same time air-blasting the carbureter to heat the top of the generator and the lining of the connection between the generator and carbureter and to heat the checkerbrick in the carbureter and superheater, said blasting being effected sufficiently to heat said checkerbrick materially above the temperature to which the same is heated in carbureted water gas manufacture utilizing oil having substantially the same characteristics as the oil hereinafter mentioned as being admitted to the tops of the generator and carbureter, respectively; then admitting steam to the top of the generator and passing the same through said connection between the top of the generator and the top of the carbureter and at the same time admitting oil to the tops of the generator and carbureter, respectively, thus producing reformed oil gas in a steam atmosphere, then withdrawing the resultant products from the superheater for storage and use, the oil gas production being stopped when the temperature of the checkerbrick has dropped to a temperature approximating the temperature to which the same would be heated by air-blasting in carbureted water gas manufacture utilizing oil for carbureting purposes having substantially the same characteristics, and then repeating the cycle, the fuel bed being occasionally downwardly air-blasted before being upwardly air-blasted.

6. A process, as set forth in claim 1, characterized additionally by the admission of steam to the bottom of the generator during the entire operation, the amount of steam admitted during the "make" period being so small as to generate no substantial amount of blue gas.

7. A process of making a substitute gas for natural gas having substantially the same characteristics as natural gas with respect to B. t. u. heating value and burning characteristics, said process being worked in standard carbureted water gas apparatus having a generator, a carbureter, a superheater, a lined connection between the top of the generator and the top of the carbureter, a connection between the carbureter and the superheater, an outlet from the generator, and a made-gas outlet from the superheater, which process comprises upwardly air-blasting the fuel bed in the generator and at the same time air-blasting the carbureter to heat the top of the generator and the lining of the connection between the generator and carbureter and to heat the checkerbrick in the carbureter and superheater, said blasting being effected sufficiently to heat said checkerbrick in the bottom of the superheater to about 1850° F.; then admitting steam to the top of the generator and passing the same through said connection to the carbureter and at the same time admitting oil to the tops of the generator and carbureter, respectively, thus producing reformed oil gas in a steam atmosphere, then withdrawing the resultant products from the superheater for storage and use, the oil gas production being stopped when the temperature of the checkerbrick has dropped to about 1450° F.; and then repeating the cycle, the fuel bed being occasionally downwardly air-blasted before being upwardly air-blasted.

8. A process, as set forth in claim 1, characterized additionally by admission of blast steam to the bottom of the generator during the air-blasting period, and by the admission, during the "make" period, to the bottom of the generator of a small amount of steam to form a steam curtain in the bottom of the generator with the production of no substantial amount of blue gas.

WILLIAM E. STEINWEDELL.